Aug. 10, 1954     R. KAISER     2,685,987
LUBRICANT PUMPING MEANS
Filed Feb. 29, 1952
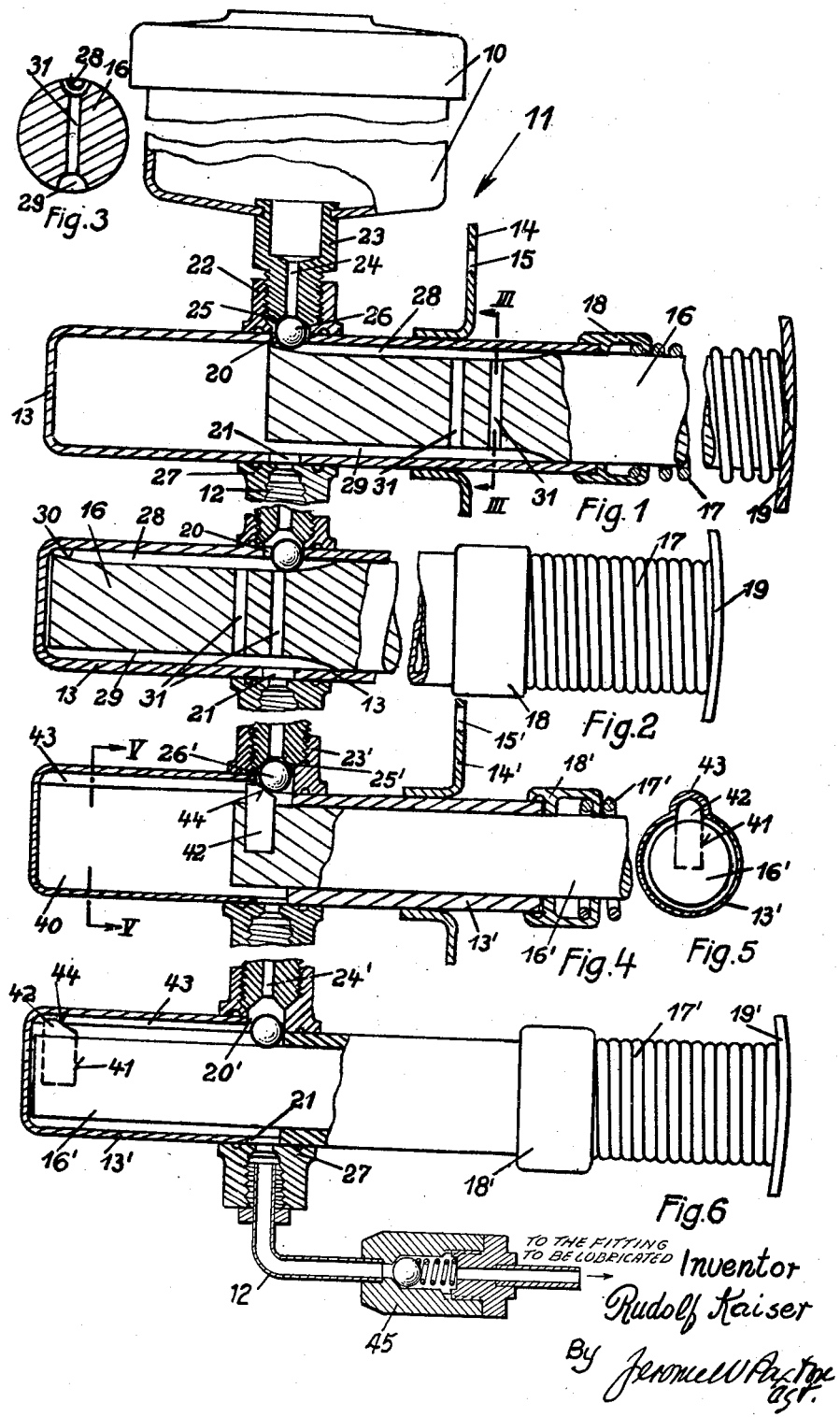
Inventor
Rudolf Kaiser
By Jerome W. Paxton Patented Aug. 10, 1954

2,685,987

UNITED STATES PATENT OFFICE 2,685,987

LUBRICANT PUMPING MEANS

Rudolf Kaiser, Ettlingen (Baden), Germany, assignor to Neue Argus Gesellschaft m. b. H., Ettlingen (Baden), Germany Application February 29, 1952, Serial No. 274,180

7 Claims. (Cl. 222—340)

The present invention relates to lubricating apparatus of the type wherein the lubricant supply source is connected by means of a check valve to a lubricant pumping apparatus, and more particularly has reference to improvements in the lubricant pumping means.

Lubricant pumping structures of this general character are employed to lubricate the fittings provided for motor vehicles, tool machines, etc., the displacement of the piston forcing the lubricant to the fitting and the "back flow" or return of the lubricant from the lubricant conduit to the cylinder being prevented by a check valve which is arranged in the discharge conduit connected to the cylinder. Heretofore such lubricant pumping means have included a spring-pressed valve for the discharge outlet of the pump cylinder in addition to the check valve in the line between the supply source and the cylinder to prevent the return of the lubricant when the piston is at rest. In operation, during the stroke of the piston toward the base of the cylinder, the valve controlling the discharge outlet is opened to enable the lubricant to be forced from the cylinder into the conduit connected with the discharge outlet, while on the return stroke the spring means closes the valves. Hence, it can be seen that in these prior constructions it is necessary to attach these two valves on the cylinder to prevent the return flow of the lubricant and consequently requires a much sturdier cylinder structure, thereby increasing the cost of manufacture.

An important object of the present invention is to provide lubricant pumping means of the type under discussion which will overcome the above and other objectionable features now present in the art by providing a cylinder and piston arrangement which eliminates the necessity of a valve in the discharge outlet in order to prevent return of the lubricant to the supply source.

A further object of the invention is to provide lubricant pumping means of the type including a cylinder, a piston reciprocable therein, a source of supply in communication with the interior of the cylinder, a check valve controlling the lubricant path between the source of supply and the cylinder, a discharge outlet in the cylinder, and means provided in the piston for defining the lubricant paths between the check valve, the working face of the piston and the discharge outlet and from the check valve through the body of the piston and to the discharge outlet, the fluid path through the piston being so constructed and arranged as to prevent the lubricant in the cylinder or the line extending from the discharge outlet from returning to the supply source during reciprocation of the piston.

To accomplish the salient objects of the invention, one form of the apparatus includes a cylinder provided with diametrically opposed inlet and discharge ports, the inlet port being in communication with a lubricant supply chamber, a ball valve for opening and closing the inlet port, a lubricant supply conduit connected to the discharge port, a check valve in the supply conduit, a piston mounted for reciprocatory movement within the cylinder, and spring means cooperating with the cylinder and piston to urge the working face of the piston away from the base of the cylinder. More specifically, the piston is provided with a pair of diametrically opposed longitudinally extending slots movable past the inlet and discharge ports, one of the slots receiving the ball and provided with an inclined face in proximity to the working face thereof for urging the ball against its seat when the piston is at rest, the depth of the slot being such as to permit the ball to move away from the seat during movement of the piston toward the base of the cylinder. To provide communication between the longitudinally extending slots, the body of the piston is provided with at least one transversely extending bore remotely located with respect to the working face of the piston whereby a fluid pathway is always present between the inlet port and the discharge port, regardless of the position of the piston in the cylinder, it being understood, of course, that return of the lubricant to the supply chamber is prevented by the ball valve associated with the inlet port.

In another form of the invention, the lubricant pathway between the inlet port and the discharge port is loctaed forwardly of the working face of the piston and not through the body of the piston. In this form, the stroke chamber of the cylinder has a greater internal diameter than the outer diameter of the piston, the piston carrying a rib projecting beyond the outer circumference of the piston at a point in proximity to the working face of the piston, the rib being guided in a longitudinal groove formed in the cylinder wall. The rib is also formed with an inclined face which serves to press the check ball into its seat in the inlet port when the piston is at rest.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation, partly broken away, and partly in cross section, of one form of the inventive concept, the piston being depicted in the rest position.

Figure 2 is a view similar to Figure 1, the supply chamber being omitted, illustrating the piston in its fully advanced position.

Figure 3 is a vertical sectional view through the piston taken along the line III—III of Figure 1, the view looking in the direction of the arrows.

Figure 4 is a fragmental vertical sectional view of a second form of lubricant pumping means depicting the piston in the rest position.

Figure 5 is a vertical sectional view taken along the line V—V of Figure 4, the view looking in the direction of the arrows, and Figure 6 is a view similar to Figure 4 showing the piston in the fully advanced position.

Referring to the drawings, a lubricant supply chamber of any suitable or convenient type 10 is operatively connected with a pumping mechanism, indicated generally 11, for forcing lubricant from the chamber 10 to a fitting (not shown) through a conduit 12 in communication with the pumping mechanism, the conduit being provided with a check valve assembly 45.

The pumping mechanism comprises a cylinder 13, preferably stamped from sheet metal, and an annular flange 14 is suitably attached to the wall of the cylinder in proximity to the open end thereof, the flange being provided with one or more apertures 15 to receive bolts or the like for securing the cylinder to a suitable supporting surface. A piston 16 is lodged within the cylinder, and a spring 17 is located between a collar 18 attached to the open end of the cylinder and an annular disk 19 secured to the end of the piston. The spring 17 normally maintains the piston in the position shown in Figure 1, that is to say in a rest or non-operating position. The piston may be advanced toward the base of the cylinder 13 manually or automatically by any suitable means.

The cylinder 13 intermediate the end thereof is provided with a pair of diametrically opposed ports or openings 20 and 21, the port 20 being the inlet port and the port 21 the outlet. An internally threaded nipple 22 is welded to the cylinder 13 and is concentric with respect to the port 20. A bolt 23 having external threads is threaded into the nipple 22 and the bolt is formed with a bore 24. The chamber 10 is connected in any convenient fashion to the bolt 23, and manifestly, a lubricant path is provided between the chamber 10 and the cylinder 13 through the bore 24 and the inlet port 20. The lower end of the bore 24 merges with a hemispherical seat 25 provided in the bolt 23, the seat 25 being adapted to receive a ball 26, the seat and ball constituting a check valve.

A nipple 27, similar to the nipple 22, is welded to the wall of the cylinder, and the discharge conduit 12 may be detachably connected thereto by means of complemental inter-engaging threads on the nipple and conduit.

The piston 16 is formed with a pair of diametrically opposed longitudinally extending slots 28 and 29, the slots being of substantially semi-circular cross section, as shown in Figure 3. The slot 28 is of substantially uniform depth, although at the end of the slot merging with the working face of the piston the slot extends slightly upwardly, defining an inclined surface 30, the purpose of which will be later more fully described. The slot 29 is similar to the slot 28 and, as shown in Figure 2, the slot 29 does not include an inclined face such as shown at 30. The slots 28 and 29 communicate with each other by means of one or more transversely extending bores 31, and while two such bores are shown, a greater or lesser number may be utilized. While it is true, as later set forth that the flowing lubricant guides the ball 26 in both directions, the inclined surface 30 of the groove 28 is important since the same, with the completely withdrawn piston ensures that the valve is closed securely. This is necessary as the cylinder 13 is not provided with a discharge valve and the container 10 would empty if in the conduit 12, a screw connection becomes loosened or a leakage arises.

The purpose of the inclined face 30 is to engage the ball 26 and move it into its seat 25 when the piston 16 is at rest, as more clearly shown in Figure 1, it being understood that movement of the working face of the piston towards the end of the cylinder 13 will permit the ball to move away from the seat 25 when the piston has advanced a sufficient distance for the ball to ride down the inclined face 30, thus opening or placing the bore 24 in communication with the interior of the cylinder 13 by virtue of the slot 28.

In operation and assuming that the pumping means is already functioning, the chamber 10, the cylinder 13 and the conduit 12 are filled with lubricant. During movement of the piston away from the base of the cylinder by the action of the spring 17, the ball 26 which will be resting on the base of the slot 28 will be urged into the seat 25 when the inclined face 30 engages the ball and, as a consequence, the lubricant path between the chamber 10 and the cylinder 13, as well as the conduit 12, is interrupted and consequently there can be no "running out" or emptying of the chamber 10, due to any mechanical failures in the discharge conduit or if leakages arise. When it is desired to force the lubricant to the fitting to be lubricated, the piston 16 is moved toward the base of the cylinder and as soon as the inclined face 30 clears the ball 26, the ball drops from its seat into the slot 28. Manifestly, the lubricant will be displaced and attempt to return to the chamber 10 through the slot 29, transverse bores 31, slot 28 and around the ball 26. However, the ball 26 will be moved along by the lubricant and again urged against the seat 25, thereby closing the bore 24. Upon further advance of the piston and more particularly when the cross bores 31 move to a point beyond the threaded nipples, the lubricant will be forced into the conduit 12, through the slot 29 and the discharge port 21 and there is no pathway by which the oil can return to the check valve. Upon movement of the piston in the opposite direction, the oil will flow from the chamber 10 and thus unseat the ball 26, whereupon the lubricant can flow through slot 28, transverse bores 31 and the slot 29 into the cylinder until the inclined face 30 again forces the ball 26 into the seat 25 and thus close the bore 24.

The lubricant in the conduit 12 cannot flow back by reason of the check valve 45 in the conduit 12 and while the check valve is preferably directly in front of the device being lubricated, the valve 45 may be located at any desired position in the conduit.

With respect to the embodiment shown in Figures 4 to 6 inclusive, corresponding parts will bear the same reference characters, with the exception that they are primed. In this embodiment, the cylinder 13' is provided with a stroke chamber 40 having a diameter greater than the external diameter of the piston 16'. The piston 16' is provided with a radial recess 41 in proximity to the working face of the cylinder, and a bolt or plate-like member 42 is lodged in the recess. As shown in Figures 4 and 5, the bolt 42 projects beyond the outer circumference of the piston and extends into a longitudinally extending groove 43 formed in the cylinder, the projecting end of the bolt and the groove serving as longitudinal guide means for the piston. The projecting end of the bolt is formed with an inclined face 44 which functions in the fashion of the inclined face 30 shown in Figures 1 to 3, namely to move the ball 26' into its seat 25' when the piston is moving to its rest position under the action of the spring 17' namely to close the check valve.

It will be appreciated that since the piston 16' is of lesser diameter than the diameter of the stroke chamber 40, there will be a continuous lubricant pathway between the inlet port 20' and the outlet port 21'. As the piston 16' is moved from the position shown in Figure 4 to that shown in Figure 6, the ball 26' will drop from its seat 25' and the oil which is displaced by the piston will tend to flow back into the chamber 10', but this movement of the lubricant will carry the ball 26' with it and urge the ball into its seat 25', thus closing the bore 24', and upon further advance of the piston 16', the oil will be forced from the chamber 40 through the discharge port 21' into the conduit 12'. Upon movement of the piston 16' in the opposite direction, the lubricant will flow around the piston into the chamber 40 until the ball 26' is again seated by the engagement of the inclined face 44 on the bolt 42.

One of the more important advantages of this particular construction over that shown in Figure 1 is that air cushions will not be present in the piston in its highest position.

From foregoing, it will be seen that the cylinder is not provided with a discharge valve which is spring biased and guided by the piston movement and closes off the discharge port. The discharge port of the cylinder is constantly open and connected with the supply source through the cylinder, the valve between the cylinder and supply source, upon the activation of the pump, being guided by the lubricant flow and also securely closed by the piston in the position of rest of the piston whereby no lubricant can flow out of the supply source.

This invention is not to be confined to any strict conformity with the showing in the drawing but may be changed or modified so long as such changes or modifications mark no material departure from the salient features of the invention as expressed in the appended claims.

I claim:

1. In a lubricating apparatus of the type having a lubricant supply chamber, lubricant pumping means, conduit means between the supply chamber and pumping means, and a ball check valve controlling the flow of lubricant through the conduit means, said lubricant pumping means comprising a cylinder, a piston reciprocable therein, spring means cooperating with the cylinder and piston to normally urge the piston away from the base of the cylinder, the said cylinder being provided with inlet and discharge ports, the inlet port communicating with said conduit means, the conduit means having a seat for receiving the ball check valve, a discharge conduit connected with said discharge port, a check valve in said discharge conduit, said piston having means cooperating with the cylinder to constitute a continuous lubricant pathway between the inlet and discharge ports, and further means on said piston to engage and move the ball check valve against its seat when the spring means moves the piston to its outermost position with respect to the base of the cylinder to securely close said inlet port and prevent lubricant flowing from the supply chamber.

2. A lubricating apparatus as defined in and claimed by claim 1, further characterized in that the means for moving the ball check valve against its seat includes an inclined surface on the piston, said surface being located in proximity to the working face of the piston.

3. A lubricating apparatus as defined in and claimed by claim 2, further characterized in that said inlet and discharge ports are diametrically opposed.

4. A lubricating apparatus as defined in and claimed by claim 1, further characterized in that the means constituting the continuous lubricant pathway betwen the inlet and discharge ports comprises longitudinally extending slots in communication with the inlet and discharge ports and at least one transverse bore extending between said slots.

5. A lubricating apparatus as defined in and claimed by claim 4, further characterized in that said longitudinally extending slots are diametrically opposed, the slot communicating with the inlet port being provided with an inclined surface in proximity to the working face of the piston for moving the ball check valve against its seat when the spring means has moved the piston to its outermost position with respect to the base of the cylinder, the said ball check valve being adapted to drop into the said slot when the piston is moved toward the base of the cylinder to place the supply chamber in communication with the cylinder through said conduit means and inlet port.

6. A lubricating apparatus as defined in and claimed by claim 1, further characterized in that said cylinder is provided with a stroke chamber of greater diameter than the diameter of said piston, and the means constituting the continuous lubricant pathway includes a bolt carried by said piston adjacent the working face thereof, the said bolt projecting beyond the outer circumference of the piston, and an inclined face on said projecting end of the bolt for engaging the ball check valve to move the valve against its seat when the spring means has moved the piston to its outermost limit with respect to the base of the stroke chamber.

7. A lubricating apparatus as defined in and claimed by claim 6, further characterized in that said stroke chamber is provided with a longitudinally extending groove for receiving the projecting end of said bolt to guide the piston with respect to the chamber.

References Cited in the file of this patent

UNITED STATES PATENTS

| Number | Name | Date |
|---|---|---|
| 1,181,837 | Campbell et al. | May 2, 1916 |
| 1,931,122 | Zerk | Oct. 17, 1933 |

FOREIGN PATENTS

| Number | Country | Date |
|---|---|---|
| 598,393 | France | Dec. 15, 1925 |